April 7, 1959 — E. F. KLESSIG ET AL — 2,880,674
POWER TRANSMISSION
Filed Sept. 11, 1953 — 2 Sheets-Sheet 1

INVENTORS
ERNST F. KLESSIG
RAYMOND B. PETTIBONE
BY
ATTORNEY

April 7, 1959    E. F. KLESSIG ET AL    2,880,674
POWER TRANSMISSION
Filed Sept. 11, 1953    2 Sheets-Sheet 2

INVENTORS
ERNST F. KLESSIG
RAYMOND B. PETTIBONE
BY
*Ralph L. Tweedale*
ATTORNEY

United States Patent Office 2,880,674
Patented Apr. 7, 1959

1

2,880,674

POWER TRANSMISSION

Ernst F. Klessig, Berkley, and Raymond B. Pettibone, Detroit, Mich., assignors to Vickers Incorporated, Detroit, Mich., a corporation of Michigan Application September 11, 1953, Serial No. 379,606

5 Claims. (Cl. 103—42)

This invention relates to power transmissions, and is particularly applicable to those of the type comprising two or more fluid pressure energy translating devices, one of which may function as a pump and another as a fluid motor.

The invention relates generally to pumps and more particularly to the type of unit known as a "power pack" comprising a pump, fluid reservoir, and usually a valve or valves integrated into a compact unit. These power pack units have had wide acceptance in the automotive and agricultural fields, due to their compactness and ease of installation. Simplicity, ruggedness of construction, low cost, long life, and efficient operation are of paramount importance in the design of such a unit. With the increasing emphasis being put on passenger car applications of hydraulic power such as: hydraulic steering boosters, hydraulic window lifts, etc., quietness of operation has become an additionally important criterion of such units.

Due to the crowded conditions in the engine compartment of present day vehicles, and in the interest of cost reduction, it has been proposed to mount the fluid pumping mechanism at one end of the vehicle generator and to power it by an extension of the generator armature shaft. Such a mounting has accomplished the desired results but has introduced a new problem due to the extremely high speeds involved in generator operation. The speed of a generator driven by a vehicle engine may reach speeds of the order of 10,000 to 12,000 r.p.m. At speeds of this magnitude the inlet zones of the fluid pumping unit may fail to fill completely resulting in the phenomenon of cavitation and its attendant noise and excessive wear.

Fluid requirements of motor vehicle accessories, such as hydraulic steering boosters, may be as high when the engine is idling as they are when it is at high speed. Thus, a fluid pump to supply those accessories must have a substantial delivery rate while the engine idles. Since the speed of a motor vehicle engine varies in the ratio of approximately 1 to 10 from idle to full speed the speed of a pump coupled to a directly driven generator will vary in the same ratio resulting in excessive delivery rates with resulting power loss during highway operation of the vehicle. A spillover type flow control valve responsive to the pump delivery rate has been found an effective solution to this problem.

It has previously been proposed to pass the fluid spilled over by such a flow control through a venturi-like throat to produce a high speed jet, and to utilize the velocity effect of that jet to increase the pressure in the inlet zones of the pump.

It is an object of this invention to provide means for increasing the inlet pressure of a pumping mechanism which utilizes fluid bypassed by a spillover type flow control valve, but which is much simpler and less expensive to construct than prior devices.

More particularly, it is an object of this invention to provide such a device which eliminates all costly loose parts and expensive machining operations, requiring only a particular relation between certain drilled passages and the flow control valve.

A further difficulty resulting from the rapid circulation of fluid through the hydraulic system induced by high speed of the pumping mechanism is the problem of removing entrained air from the fluid. When this air is not removed, spongy and erratic fluid motor operation results.

It is an object of this invention to provide a circulating system which effectively rids the circulating fluid of entrained air, and at the same time removes foreign matter therefrom.

Another object is to provide such a unit having a novel arrangement of a filter element which cooperates with the pump head and the reservoir to form a filter chamber and further to provide a low cost arrangement for providing for release of fluid from the filter chamber in the event the filter becomes clogged.

Further objects and advantages of the present invention will be apparent in the following description, reference being had to the accompanying drawings wherein a preferred form of the present invention is clearly shown.

Figures 1, 2, 3:
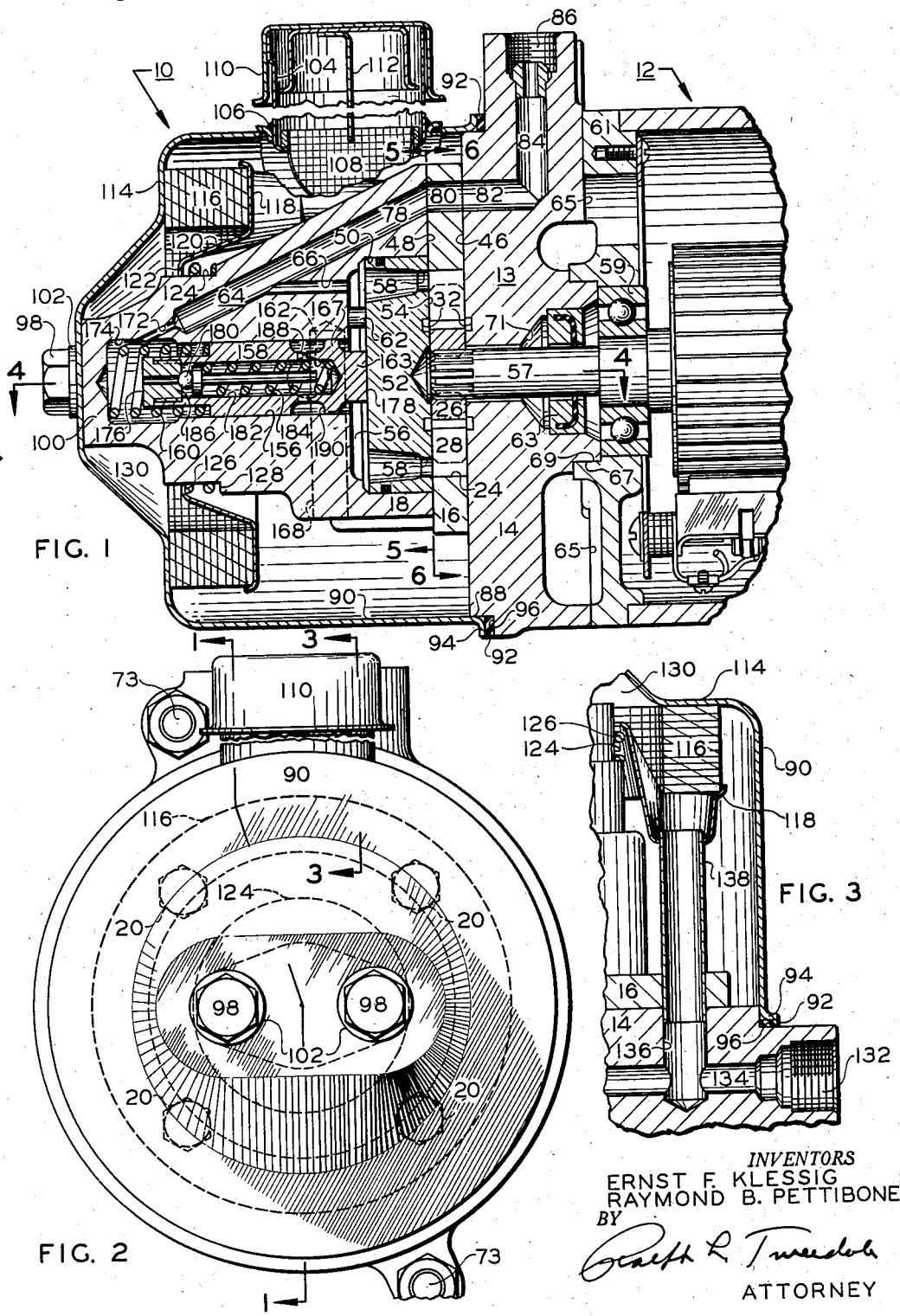
Figure 1 is a longitudinal sectional view of a device embodying the present invention.
Figure 2 is an elevation taken from the left end of Figure 1.
Figure 3 is a partial section taken on line 3—3 of Figure 2.
Figure 5:
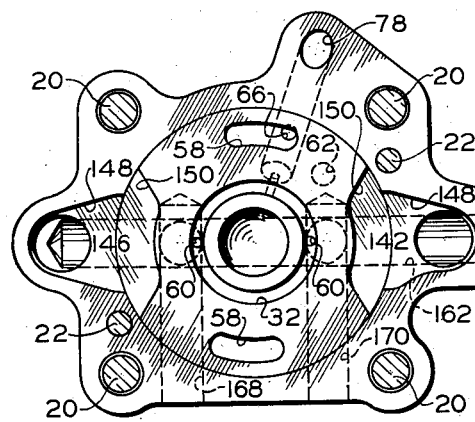
Figure 5 is a partial section taken on line 5—5 of Figure 1.
Figure 6:
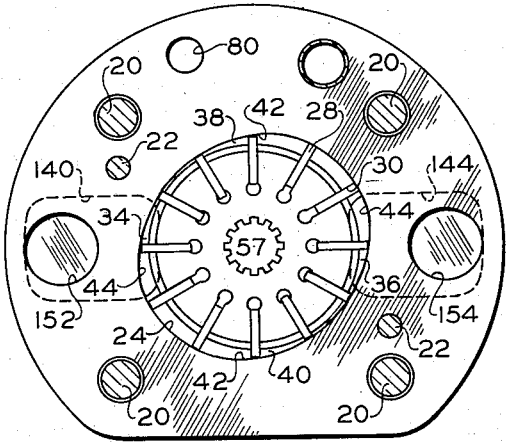
Figure 6 is a partial section taken on line 6—6 of Figure 1.
Figure 7:
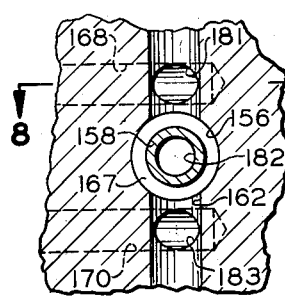
Figure 7 is a partial section taken on line 7—7 of Figure 4.

Referring now to Figure 1 there is shown a pump, generally designated 10, and a generator, generally designated 12. The pump 10 includes a main body or casing 13, comprising a body member 14, a ring 16, and a head 18 arranged in a sandwich relation and secured together by a plurality of bolts 20 which extend through the head 18 and ring 16 into threaded holes in body 14. The proper angular relation between the body 14, ring 16, and head 18 is maintained by dowels 22 as seen in Figures 5 and 6.

The ring 16 provides a stator element having a generally elliptically contoured bore 24 therein. A rotor 26, carrying a plurality of vanes 28 slidable in substantially radial slots 30, is positioned in bore 24 in a telescopic relation with the ring 16. During operation of the pump the ends of vanes 28 are maintained radially outward against the bore 24 by centrifugal force aided by pressure conducted to the inner ends of the vanes through a pair of annular channels 32 which overlie the enlarged inner ends of slots 30.

The spaces between the adjacent vanes may be termed working chambers and it should be noted that each has a complementary working chamber diametrically opposed thereto. For example, chambers 34 and 36 are a complementary pair as are chambers 38 and 40. Assuming counterclockwise rotation of rotor 26, as viewed in Figure 6, it can be seen that the chambers 34 and 36 are at the moment increasing in volume while chambers 38 and 40 are decreasing. Those portions of the space between the ring and the rotor through which the working chambers pass while decreasing in size may be termed outlet zones 42 while those through which they pass while increasing in size may be termed inlet zones 44. Since each zone has a diametrically opposed complementary zone, hydraulically balanced pumping action is provided. Such pumping mechanism is described in more detail in a patent to Harry F. Vickers, 1,989,900.

Body 14 includes a plane face 46 which axially abuts ring 16 and against which rotor 26 and the vanes 28 are axially slidable. The axially opposed end of ring 16 is abutted by a plane face 48 of the head 18. A recess 50 extends into head 18 from the face 48. A pressure plate 52 is axially slidable in recess 50, and has a face 54 which axially abuts ring 16, rotor 26, and vanes 28. Pressure plate 52 is in peripheral fluid sealing engagement with recess 50, and cooperates therewith to form a pressure chamber 56. It can be seen that pressure in chamber 56 will bias pressure plate 52 axially into engagement with ring 16, rotor 26, and vane 28. Further, since rotor 26 is made slightly thinner than ring 16 to provide running clearance, pressure in chamber 56 will induce deflection of plate 52 into the bore 24 toward rotor 26, thus reducing end clearance and leakage at high pressures. The sealing action of pressure plate 52 is described in more detail in the patent to Duncan B. Gardiner et al., No. 2,544,988.

An extension 57 of the armature shaft of generator 12 is spline connected to the rotor 26 of pump 10 and serves as a drive shaft therefor. The armature bearing 59 in the end bell 61 of the generator is thus utilized in a dual function to provide radial support for both the generator armature and the pump rotor. A shaft seal 63 in pump body 14 prevents fluid leakage around shaft extension 57 at its point of emergence from the body. Pads 65 on the pump body contact the generator end bell and are secured thereto by bolts 73. Proper radial relation between the pump 10 and generator 12 is maintained by a pilot 67 in the pump body 14 which engages a bore 69 in the generator end bell.

Figure 4:
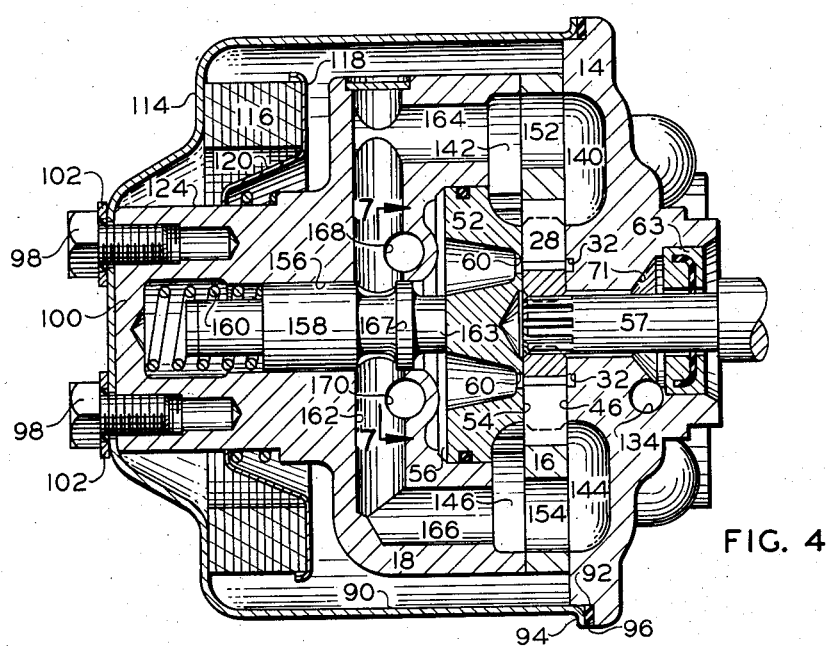
Figure 4 is a section taken on line 4—4 of Figure 1.

The shaft bore 71 is vented to low pressure by an extension of passage 134, to prevent pressure build up ahead of seal 63. This can best be seen by reference to Figures 3 and 4.

As heretofore mentioned, the working chambers between adjacent vanes are decreasing in size as they pass through the outlet zone 42. A pair of kidney-shaped outlet ports 58 overlie the outlet zones 42 and extend completely through the pressure plae 52 into pressure chamber 56. Fluid displaced by the pumping mechanism passes through ports 58 to pressure chamber 56 where operating pressure of the unit thus exists. Drilled passages 60 extend through the pressure plate 52 to communicate with the annular channels 32 for the purpose heretofore mentioned.

A dowel pin 62 extends from head 18 into pressure plate 52 to maintain the desired angular relation therebetween.

From chamber 56 fluid displaced by the pumping mechanism passes through a delivery passage, generally designated 64. Passage 64 includes a relatively restricted portion 66 which extends from pressure chamber 56 into an angularly extending passage 78. Passage 78 cooperates with a passage 80 through the ring 16 and a corresponding passage 82 in the body 14. The passages 78, 80, and 82 are coincident at the juncture of body 14, ring 16, and head 18, and serve to conduct fluid to a passage 84 in the body 14, which terminates in a threaded external delivery connection port 86.

Face 46 of body 14, against which the ring 16 and the rotor 26 abut, extends laterally outward to a cylindrical pilot 88 formed on the body 14. Pilot 88 forms a guide for the open end of a tank 90 which extends axially over the head 18 to compress a seal 92 between its flared end 94 and the shoulder 96 on the body 14. Tank 90 is secured in place by a pair of bolts 98 which extend through the closed ends thereof, and engage screw threads in the axially extending portion 100 of head 18. Washers 102, which encircle the bolts 98, have included therein deformable sealing elements which prevent leakage from the tank 90 at the bolt holes. The advantage of such an arrangement is that pump body 14 acts in the dual capacity of a closure for the open end of tank 90 as well as its normal function as the pump body. Since fluid in tank 90 will completely surround head 18 and ring 16 filling all indentations and irregularities in conformation with fluid, maximum reservoir capacity is provided although minimum space is occupied. A vertically extending generally cylindrical filler neck 104, is welded or brazed to the tank 90 at 106. Screen 108 prevents foreign matter from entering the tank and the filler neck is closed by a cap 110, having a level indicator 112 affixed thereto. The filler neck 104 actually extends to a height of about four inches above the tank to provide additional reservoir capacity, though for convenience in illustration is shown broken off.

The tank 90 is flanged radially inward at 114 and the flanged portion 114 is abutted by an annular filter element 116. A stamped filter base 118 contacts the inner end of the filter element 116 and has an inner portion 120 which extends angularly inward to terminate in a radial shoulder 122. The inside diameter of shoulder 122 is selected to fit snugly but slidable on a cylindrical pilot 124 machined on the extension 100 of the pump head 18. A spring 126 acts between a shoulder 128 on the head 18 and the shoulder 122 to bias the sealing element against the shoulder formed by flanged portion 114 of the tank. There is thus formed a chamber 130 from which the oil must pass through the filter element 116 to reach the interior of the tank 90.

Body 14 has therein a threaded external inlet connection port 132 from which a drilled passage 134 extends inwardly to intersect an axial passage 136 in which is slidably inserted a tube 138. Tube 138 extends through the tank 90 to connect with the filter base 118. Port 132, passages 134, 136, and 138 serve to conduct fluid returning to the pump to the interior of the filter chamber 130 from whence, as was heretofore pointed out, it must pass through the filter element 116 to get to the interior of tank 90. By thus circulating all the returning fluid through the filter and into the tank, deaeration, cooling and cleaning of the fluid is effectively accomplished. It can be seen that should the filter element 116 become clogged with dirt by reason of failure to clean or replace at proper intervals, or should oil viscosity be excessive during cold starts, returning fluid will cause an increase in pressure in chamber 130 which will react against the filter element 116, and the filter base 118 to move them away from the flange 114 to permit continued circulation of fluid even though circulation through the filter is limited.

Each inlet zone 44 has two axially opposed inlet ports cooperating therewith. Such an arrangement is highly desirable since fluid to fill the inlet zones can enter them from both sides, thus reducing the time required to effect complete filling. The inlet ports comprise paired pockets overlying the axially opposed ends of each zone. Pockets 140 and 142 are a cooperating pair as are 144 and 146. Pockets 140 and 144 are formed by recesses in the face 46 of the body 14 and are laterally bounded by the juncture of face 46 with ring 16 and rotor 26. Pockets 142 and 146 are formed by recesses 148 in the head 18 extending inwardly to communicate with laterally outward opening recesses 150 in the pressure plate 52 as can best be seen in Figure 5. Pockets 142 and 146 are laterally bounded by the juncture of face 54 of the pressure plate 52 with the ring 16 and the rotor 26 and by juncture of face 48 of head 18 with ring 16. The pockets 140 and 144, as well as pockets 142 and 146, extend laterally outward from inlet zones 44 to overlie a portion of ring 16. An axial passage 152 extends through the ring 16 to interconnect pockets 140 and 142 and a similar passage 154 interconnects pockets 144 and 146.

Head 18 has an axial bore 156 which breaks into the pressure chamber 56. A valve spool 158 is slidably inserted in the bore 156 and is biased by a spring 160 to a normal position established by abutment of nose 163 with pressure plate 52. Spring 160 thus biases the spool 158 to its normal position and serves the additional function of initially biasing the pressure plate 52 against the ring 16, rotor 26 and vanes 28.

Bore 156 is intersected perpendicularly by a transverse bore 162 which extends across the pump head 18 to intersect a pair of axial bores 164 and 166. Passages 164 and 166 respectively extend from the passage 162 to the pockets 142 and 146 for the purpose of conducting fluid thereto and supercharging the pump inlet zones as hereinafter described. A land 167 on spool 158 isolates bore 162 from communication with pressure chamber 56 in the normal position of the spool.

Passage 162 is also intersected by a pair of transverse passages 168 and 170 which extend downwardly from the point of intersection to emerge from the head 18 and communicate with the interior of tank 90. The passages 168 and 170 intersect the passage 162 on the pressure chamber side thereof and in close proximity to the intersection of passage 162 and bore 156. Fluid is supplied to the inlet zones of the pumping mechanism through these passages. During low speed operation the reduced pressure at the inlet zones of the pumping mechanism caused by the expanding working chambers enables atmospheric pressure of the fluid in the reservoir to induce flow of fluid from the tank 90 through the passages 168 and 170 to the paired inlet ports 140, 142, 144, and 146.

As heretofore discussed, fluid displaced by the pumping mechanism is discharged through outlet passage 64. A restricted drilled passage 172 leads to a pressure chamber 174 at the outer end of bore 156 from a point downstream of the restriction 66 in outlet passage 64. It can be seen that pressure conducted from the delivery passage 64 to the pressure chamber 174 will be that downstream from restriction 66 and that it reacts against the axial projection of area 176 to produce a force which aids spring 160 in biasing the valve 158 to its normal position abutting pressure plate 52. Pressure in chamber 56 reacts against the axial projection of area 178 tending to move the spool against the spring 160 and the force on spool 168 created by pressure in chamber 174. The restricted passage 66 thus acts as a metering orifice, pressure at the opposite sides of which is exerted upon equal and opposed areas of the valve 158.

Until the pressure unbalance across restriction 66 is sufficient to compress spring 160, the entire output of the pumping mechanism will go through the outlet passage 78 to the external delivery connection port 86. As speed of the pump increases, the increased flow through restriction 66 causes sufficient pressure drop to overcome the biasing force of spring 160, and spool 58 will move outward and land 167 will move across and uncover the transverse bore 162 thus venting chamber 56 to the passage 162 which communicates with the inlet zones of the pumping mechanism. As the pump delivery volume increases past the cracking point of the valve 158, the valve will open wider thus bypassing a greater part of the pump delivery. At all speeds above the cracking point of valve 158, the valve will tend to maintain the pressure drop across restriction 66 constant thereby maintaining the flow rate therethrough constant.

Since during operation the pressure in chamber 56 will normally be high relative to the pressure in passage 162, the fluid diverted from chamber 56 to passage 162 by the opening of valve 158 will attain a high velocity. The particular arrangement of bore 156 and passages 162, 168, and 170 is such as to utilize this high velocity for supercharging the inlet zones of the pumping mechanism.

Figure 8:
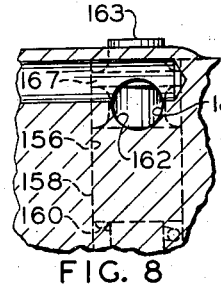
Figure 8 is a partial section taken on line 8—8 of Figure 7.
Figure 9:
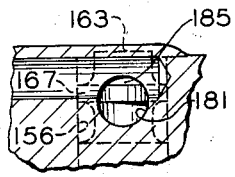
Figure 9 is a partial view similar to Figure 8, but showing the operating parts in a different relative position.

Referring particularly to Figures 4, 5, 7, and 8 it can be seen that the center lines of bore 156 and passage 162 perpendicularly intersect and that the passages 168 and 170 are perpendicularly offset from passage 162 and intersect passage 162 on the side adjacent pressure chamber 56 and proximate the intersection of bore 156 and the passage 162. The points of juncture of passages 168 and 170 with passage 162 may be termed "supply openings" and are clearly shown at 181 and 183 in Figure 7. Figures 8 and 9 are similar to one another except that in Figure 8 the valve 158 is shown in its normal closed position, whereas in Figure 9 the spool is shown as having moved to a point where the land 167 establishes communication between the pressure chamber 56 and the bore 162 by creating a pair of circular-segment shaped orifices 185, one of which is shown in Figure 9. When the spool is in the position illustrated in Figure 9, there will, of course, be a corresponding orifice 185, not shown, adjacent the point of intersection 183. It can be seen that the high velocity fluid discharged across the valve 156 immediately spurts across the openings 181 and 183. According to well known physical laws, the high velocity of this fluid is accompanied by a low static pressure, and fluid from the reservoir will be picked up by the jets and impelled rapidly toward the outer ends of the passage 162, where the kinetic energy of the rapidly moving fluid will be transformed into a static pressure which supercharges the inlet zones of the pumping mechanism. It should be noted that this invention provides means for supercharging the inlet zones of the pumping mechanism when needed and only when needed, that is during high speed operation, and has eliminated the complex parts and the difficult machining operations which have been characteristic of other devices which have utilized velocity effects to produce supercharge. No venturis or constricted passages are necessary. Only standard drilling operations are required in the applicant's device. Utilization of the high velocity jet from the flow control valve and the proper placement of the reservoir connection passages 168 and 170 have made this possible. The present invention has a further advantage over prior devices in that not only is the supercharging effect produced only when required because of increase in pump speed, but the magnitude of the effect is also varied in accordance with needs. For example, as the operating pressure of the pumping mechanism increases, the deleterious effect of cavitation is magnified and it becomes desirable to increase supercharge pressure. This is automatically accomplished by the present invention since increased operating pressure increases the pressure differential across the orifices 185, resulting in increased velocity therethrough, with consequent increase in the supercharge produced.

Valve 158 has an additional function in that it operates as a pilot controlled relief valve. The pilot valve 180 is positioned in a central bore 182 in the valve 158. A spring 184 biases the pilot valve 180 toward a seat 186. The central bore 182 is vented through passages 188 which communicate through an annular groove 190 with the transverse passage 162. Spring 184 is so selected as to maintain pilot valve 180 seated until pressure in the pump outlet passage reaches a predetermined maximum. At this time the pilot valve 180 opens venting fluid from the chamber 174 and reducing the pressure therein due to pressure drop across restriction 172. The reduction in pressure in chamber 174 permits pressure in chamber 56 acting on the area 178 of the valve 158 to operate the valve to bypass sufficient pump flow to maintain the operating pressure within safe limits.

In operation, the generator 12 will be drivingly connected to the engine of a motor vehicle and the ports 86 and 132 of the pump 10 may be respectively connected to the inlet and return ports of a fluid motor, not shown. As heretofore described fluid returning from the motor will enter port 132 and, through passage 134 and 136 and the tube 138, be conducted to the filter chamber 130. From chamber 130 the returning fluid will pass through the filter 116 to the interior of tank 90. Passage through the filter 116 removes foreign matter and deaerates the fluid. In the interior of tank 90 the returning fluid is diffused with the fresh cool fluid therein, and after a period of relative quiescence during which cooling and further deaeration takes place, is drawn into the passages 168 and 170 from which it passes through the passage 162 and passages 164 and 166 to the inlet zones of the pumping mechanism. During low speed operation, atmospheric pressure on the fluid in tank 90 will maintain substantially atmospheric pressure in the pockets of the inlet ports. This is sufficient to prevent cavitation at low speed.

As the speed of the vehicle engine and pump 10 increase it becomes necessary to bypass part of the pump flow and also to supercharge the pump inlet zones to prevent cavitation. As heretofore pointed out the fluid bypassed by the spillover flow control valve 158 is utilized to increase the pressure in the pump inlet zones. The high speed jets of fluid produced by passage of bypassed fluid through the orifices 185, created by opening of valve 158, are directed axially of passage 162 and spurt across the intersection of passage 162 and the passage 168 and 170 while traveling at near their maximum velocity. Replenishing fluid is entrained in the jets from orifices 185 and the kinetic energy of the rapidly moving fluid is converted to static pressure thus increasing the pressure at the inlet zones of the pumping mechanism.

There has thus been provided pumping mechanism having efficient and extremely low cost means for supercharging the inlet zones thereof.

Further the invention provides in such mechanism a fluid circulating system in which the operating fluid is thoroughly filtered and deaerated and this has been accomplished by the use of a novel and low cost combination of filter, reservoir, and pumping head.

While the form of embodiment of the invention as herein disclosed constitutes a preferred form, it is to be understood that other forms might be adopted, all coming within the scope of the claims which follow.

What is claimed is as follows:

1. In a fluid pumping mechanism having inlet and outlet zones, a fluid distributing system comprising: means forming a cylindrical valve bore communicating with said outlet zone; means forming a cylindrical fluid passage transversely intersecting said valve bore and communicating with said inlet zone; valve means in said bore normally isolating said outlet zone from said fluid passage, said valve means being shiftable to bypass fluid from said outlet zone to said inlet zone by creating an orifice between said bore and said fluid passage; and means forming a supply passage intersecting said fluid passage to form a supply opening adjacent said orifice, said supply passage being offset with respect to said fluid passage in the direction of said orifice, whereby the velocity imparted to the bypassed fluid by the pressure drop across the orifice is utilized to increase pressure at the inlet zone.

2. In a fluid pumping mechanism having inlet and outlet zones, a fluid distributing system comprising: means forming a cylindrical valve bore communicating with said outlet zone; means forming a cylindrical fluid passage transversely intersecting said valve bore and communicating with said inlet zone; valve means in said bore normally isolating said outlet zone from said fluid passage, said valve means being shiftable to bypass fluid from said outlet zone to said inlet zone by uncovering the intersection between said bore and said fluid passage and thus creating an orifice between said bore and said fluid passage; and means forming a supply passage intersecting said fluid passage to form a supply opening adjacent said orifice, said supply passage being offset with respect to said fluid passage in the direction of said orifice, whereby the velocity imparted to the bypassed fluid by the pressure drop across the orifice is utilized to increase pressure at the inlet zone.

3. In a fluid pumping mechanism having inlet and outlet zones, a fluid distributing system comprising: means forming a cylindrical valve bore communicating with said outlet zone; means forming a cylindrical fluid passage transversely intersecting said valve bore and communicating with said inlet zone; valve means in said bore normally isolating said outlet zone from said fluid passage, said valve means being shiftable to bypass fluid from said outlet zone to said inlet zone by creating an orifice between said bore and said fluid passage, said orifice having a cross sectional area projectable axially of said fluid passage to lie wholly within said fluid passage; and means forming a supply passage intersecting said fluid passage to form a supply opening adjacent said orifice, said supply passage being offset with respect to said fluid passage in the direction of said orifice, whereby the velocity imparted to the bypassed fluid by the pressure drop across the orifice is utilized to increase pressure at the inlet zone.

4. In a fluid pumping mechanism having paired diametrically opposed inlet and outlet zones, a fluid distributing system comprising: means forming a cylindrical valve bore communicating with said outlet zones; means forming a cylindrical fluid passage transversely intersecting said valve bore and having a branch communicating from each side of said bore with one of said inlet zones; valve means in said bore normally isolating said outlet zones from said fluid passage, said valve means being shiftable to bypass fluid from said outlet zones to said inlet zones by creating a pair of orifices between said bore and said fluid passage; and means forming a pair of supply passages intersecting said fluid passage to form supply openings adjacent said orifices, said supply passages being offset with respect to said fluid passage in the direction of said orifices, whereby the velocity imparted to the bypassed fluid by the pressure drop across the orifices is utilized to increase pressure at the inlet zones.

5. In a fluid pumping mechanism having inlet and outlet zones, a fluid distributing system comprising: means forming a cylindrical valve bore communicating with said outlet zone; means forming a cylindrical fluid passage transversely intersecting said valve bore and communicating with said inlet zone; a fluid delivery passage extending from said outlet zone; valve means in said bore normally isolating said outlet zone from said fluid passage, said valve means being shiftable in response to the rate of flow in said delivery passage to bypass fluid from said outlet zone to said inlet zone by creating an orifice between said bore and said fluid passage; and means forming a supply passage intersecting said fluid passage to form a supply opening adjacent said orifice, said supply passage being offset with respect to said fluid passage in the direction of said orifice, whereby the velocity imparted to the bypassed fluid by the pressure drop across the orifice is utilized to increase pressure at the inlet zone.

References Cited in the file of this patent

UNITED STATES PATENTS

| | | |
|---|---|---|
| 1,413,066 | Schlacks | Apr. 18, 1922 |
| 2,251,664 | Davis | Aug. 5, 1941 |
| 2,281,302 | Amery | Apr. 28, 1942 |
| 2,631,540 | Baugh | Mar. 17, 1953 |
| 2,638,848 | Johnson | May 19, 1953 |
| 2,698,579 | Hammond | Jan. 4, 1955 |
| 2,724,335 | Eames | Nov. 22, 1955 |
| 2,733,662 | Hunter | Feb. 7, 1956 |
| 2,739,538 | Witchger | Mar. 27, 1956 |
| 2,746,392 | Klessig et al. | May 22, 1956 |
| 2,748,711 | Drude | June 5, 1956 |
| 2,752,853 | Eames | July 3, 1956 |